July 15, 1924.
M. KIPPERMAN
1,501,405
ADVERTISING AUTOMOBILE BODY
Filed July 11, 1923
4 Sheets-Sheet 1
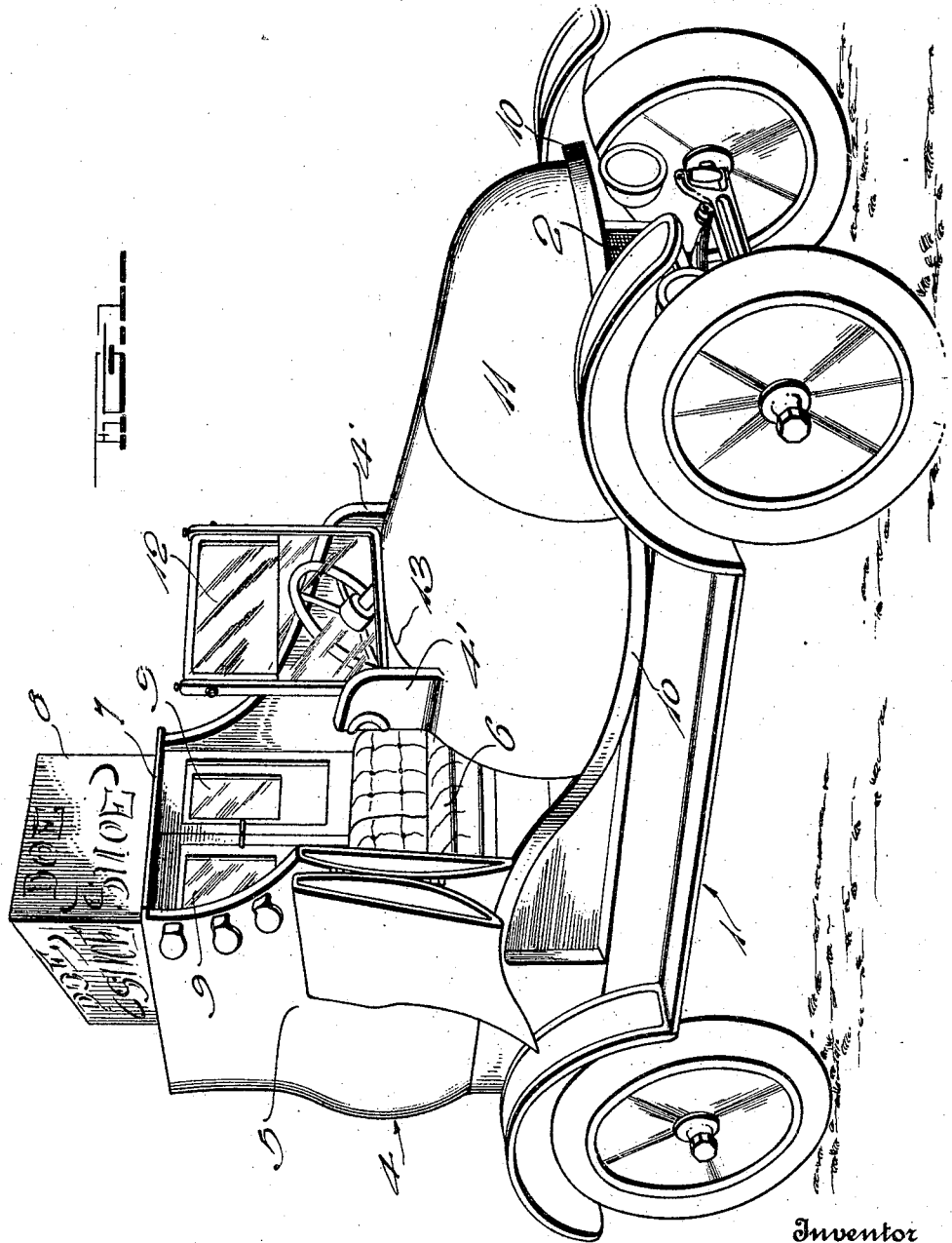
Witness
H. Woodard
Inventor
Mendel Kipperman
By H. B. Willson & Co.
Attorneys

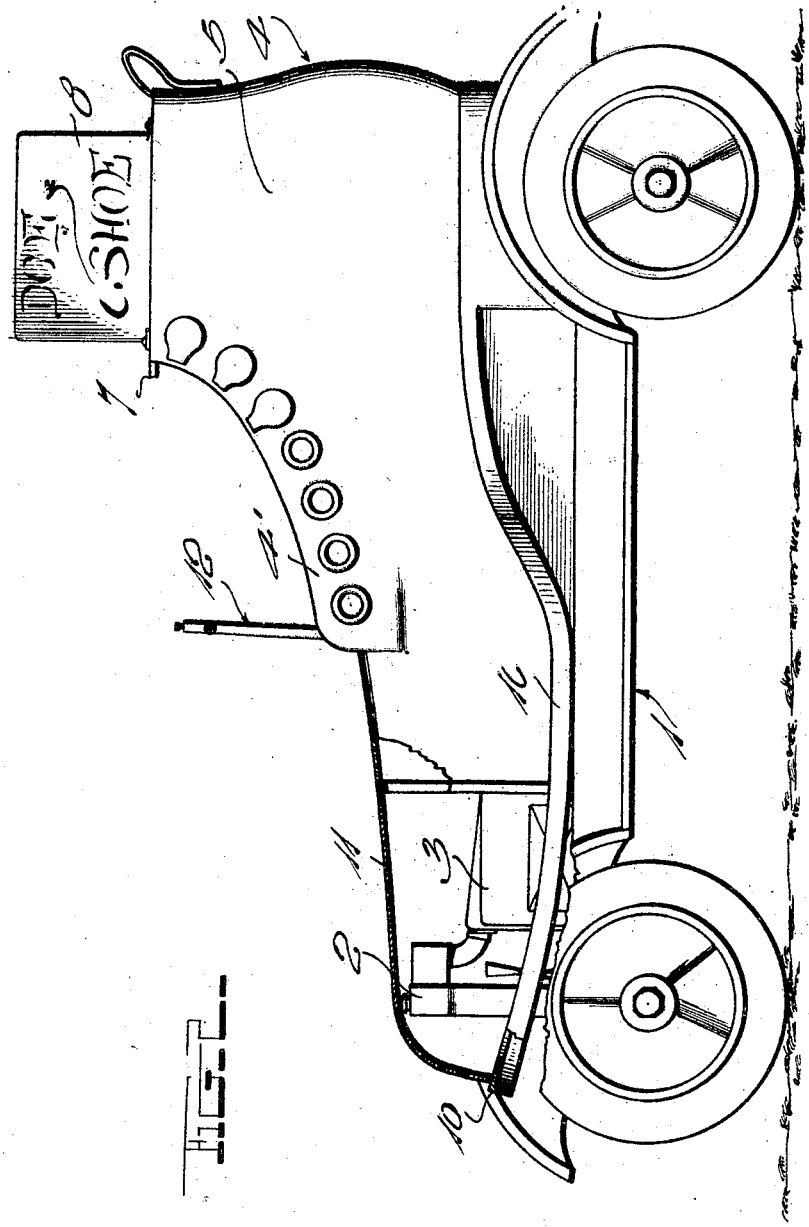

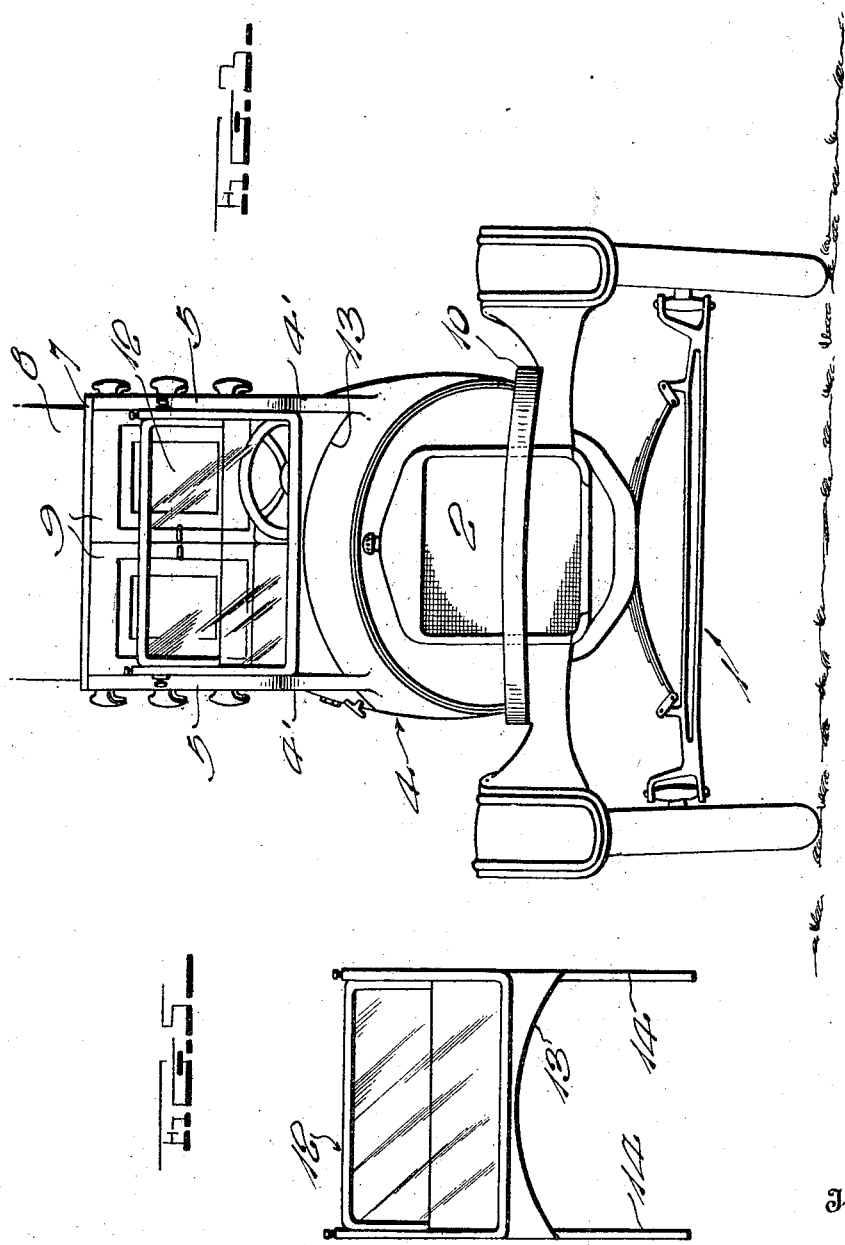

July 15, 1924.
M. KIPPERMAN
ADVERTISING AUTOMOBILE BODY
Filed July 11, 1923
1,501,405
4 Sheets-Sheet 4
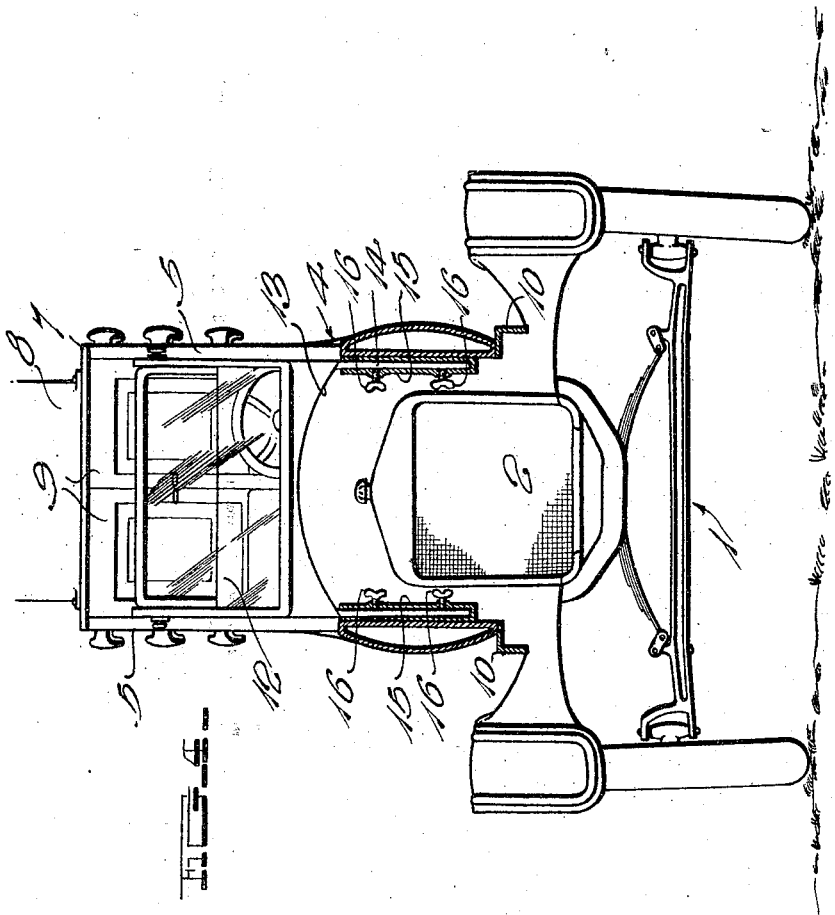
Witness
H. Woodard
Inventor
Mendel Kipperman
By H. B. Wilson & Co.
Attorneys Patented July 15, 1924.

1,501,405

UNITED STATES PATENT OFFICE.

MENDEL KIPPERMAN, OF DAVENPORT, IOWA.

ADVERTISING AUTOMOBILE BODY.

Application filed July 11, 1923. Serial No. 650,944.

*To all whom it may concern:*

Be it known that I, MENDEL KIPPERMAN, a citizen of the United States, residing at Davenport, in the county of Scott and State of Iowa, have invented certain new and useful Improvements in Advertising Automobile Bodies; and I do declare the following to be a full, clear, and exact description of the invention, such as will enable others skilled in the art to which it appertains to make and use the same.

My invention relates to automobile bodies constructed for advertising purposes and has reference more particularly to a body in the form of a shoe.

One object is to provide a body which will present an attractive appearance and may extend throughout the length of the automobile chassis without interfering with cooling of the motor or causing the operator to sit in a cramped position.

Another object is to form a hood for the automobile motor, of the portion of the body which constitutes the shoe tip.

A further aim is to provide a supporting frame for the hood or tip which represents the front end of the shoe sole.

A still further object is to give ample room for the operator and controls, by forming the body in the shape of a blucher shoe with its blucher flaps turned upwardly, thus providing more space than could be otherwise obtained.

Yet another aim is to make ample provision for carrying packages, for which purpose the entire rear end of the body is utilized.

A still further object is to provide a unique form of detachable windshield which may be used when necessary.

With the foregoing in view, the invention resides in the novel subject matter hereinafter described and claimed, the description being supplemented by the accompanying drawings.

Figure 1 is a perspective view of an automobile body constructed in accordance with my invention.

Figure 2 is a side elevation partly broken away and in vertical section.

Figure 3 is a front elevation with the hood or shoe tip removed.

Figure 4 is a front elevation with parts in vertical section showing the manner of detachably securing the windshield in place.

Figure 5 is a front elevation of the windshield detached from the body.

I have illustrated my improved body in connection with an automobile chassis 1 of well known construction, said chassis including the usual radiator 2 at its front end and motor 3 behind said radiator. Extending throughout the length of the chassis 1, is a body 4 preferably in the form of a blucher shoe as shown, with its blucher flaps 4' turned upwardly and disposed in substantially the same plane with the rear portions 5 of the shoe upper sides. By disposing the blucher flaps in this manner, ample room is given in the body for a driver's seat 6 and the necessary controls for operating the machine. I provide the portion of the body, behind the seat 6, with a suitable top 7 which may carry advertising panels 8, and from the front end of said top 7, I extend a transverse partition downward to the seat, said partition being preferably formed by a pair of doors 9. Thus, the entire rear end of the body is formed into a carrying compartment which is readily accessible for inserting or removing packages.

The sole of the shoe is represented by a suitable open frame 10, the front end of which extends along both sides of the radiator 2 and motor 3 and passes in front of said radiator as shown. This front end of the frame supports the shoe tip forming portion 11 of the body 3 and this portion constitutes a hood for the motor substantially obscuring the radiator 2. The hood 11, and the frame 10 adjacent the motor and radiator however, are open to permit an abundance of air to enter for the purpose of keeping the motor cool. In cold weather, the usual automobile hood (not shown) may be placed over the motor 3 and obscured from view by the tip forming hood 11.

For use, when desirable, I provide a windshield 12 suitably shaped at its lower edge, as indicated at 13, to engage the vamp portion of the body, between the front ends of the blucher flaps 4'. During good weather however, this windshield may be detached, as it detracts somewhat from the appearance of the body. For securing the shield in place and permitting detachment thereof when desired, I prefer to provide the construction shown most clearly in Figs.

4 and 5, from which views, it will be seen that the windshield is provided with a pair of depending rigid arms 14 received in vertically disposed guides 15 secured to the inner side of the body, set-screws 16 being threaded through said guides for holding the arms in operative position.

By providing the construction shown and described or a substantial equivalent thereof, an advertising body is provided which will present an exceptionally attractive appearance, yet it will not inconvenience the driver, will provide ample package-carrying space, and will not interfere with proper cooling of the motor. As excellent results have been obtained from the general construction disclosed, it is preferably followed, but within the scope of the invention as claimed, numerous changes may be made.

I prefer to make provision whereby a canopy (not shown) may be stretched between the wind shield 12 and the top or platform 7, and it will be obvious that side curtains also may be used when desired, the canopy and curtains being carried in the body when their use is not necessary.

I claim:

1. An advertising automobile body in the form of a shoe, with the tip of the shoe forming a motor hood and removable for gaining access to the automobile motor.

2. An advertising automobile comprising a chassis having a radiator at its front end and a motor behind said radiator, a body in the form of a shoe, said body being mounted on the chassis frame and having its shoe tip forming portion positioned over the motor and radiator and curved downwardly in forwardly spaced relation with the upper portion of said radiator, said tip forming portion being open at its lower side to permit free passage of air through the radiator and around the motor.

3. An advertising automobile body in the form of a shoe having a frame constituting the front end of the shoe sole contiguous to the shoe tip forming portion of the body, said tip forming portion being removably mounted on said frame and forming a hood for the automobile motor.

4. A structure as specified in claim 3; said frame being open and adapted to extend along opposite sides of the automobile motor and in front of the radiator.

5. An advertising automobile body in the form of a blucher shoe with the blucher flaps turned upwardly, providing an open space between them to accommodate the driver and controls.

6. An advertising automobile body in the form of a blucher shoe with its blucher flaps turned upwardly and disposed in substantially the same planes with the rear portions of the shoe sides, a top closing the upper end of the shoe in rear of said flaps, and a transverse partition extending downwardly from said top, providing a carrying compartment in the rear of the shoe.

7. An advertising automobile body in the form of a blucher shoe with its blucher flaps turned upwardly, a windshield extending between the front ends of said flaps and having depending rigid arms, and guides carried by the body receiving said arms removably.

8. A structure as specified in claim 6; said partition being formed primarily by a door giving access to said compartment.

9. A device of the class described, comprising a motor driven vehicle, having a body in the form of a shoe, the upper part of said body being fitted with a platform for the support of advertising matter.

10. A device of the class described, comprising a motor driven vehicle, having a body in the form of a shoe, containing an operator's seat, the heel portion in rear of said seat being enclosed to form a parcel compartment, and means of access to said compartment.

In testimony whereof I have hereunto affixed my signature.

MENDEL KIPPERMAN.